(12) United States Patent
Ashley-Rollman et al.

(10) Patent No.: US 9,477,650 B2
(45) Date of Patent: Oct. 25, 2016

(54) UNDERLYING GRID STRUCTURE AND ANIMATION OF TABLES

(75) Inventors: Caitlin Ashley-Rollman, Redmond, WA (US); Malia Douglas, Seattle, WA (US); Jessica Arwen Best, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/220,946

(22) Filed: Aug. 30, 2011

(65) Prior Publication Data

US 2013/0055061 A1    Feb. 28, 2013

(51) Int. Cl.
*G06F 17/24*    (2006.01)

(52) U.S. Cl.
CPC .................................. *G06F 17/245* (2013.01)

(58) Field of Classification Search
CPC ....................................................... G06F 17/24
USPC ........................................................ 715/228
See application file for complete search history.

(56) References Cited

U.S. PATENT DOCUMENTS

| | | | |
|---|---|---|---|
| 5,717,939 A | 2/1998 | Bricklin | |
| 5,838,317 A | 11/1998 | Bolnick | |
| 5,914,718 A | 6/1999 | Chiu | |
| 5,982,383 A | 11/1999 | Kumar | |
| 6,256,649 B1 * | 7/2001 | Mackinlay et al. | 715/212 |
| 6,292,809 B1 * | 9/2001 | Edelman | 715/273 |
| 6,919,890 B2 | 7/2005 | Halstead, Jr. | |
| 7,127,672 B1 * | 10/2006 | Patterson et al. | 715/220 |
| 7,412,645 B2 | 8/2008 | Kotler | |
| 7,461,077 B1 | 12/2008 | Greenwood | |
| 2010/0153349 A1 | 6/2010 | Schroth | |
| 2010/0235769 A1 | 9/2010 | Young | |

FOREIGN PATENT DOCUMENTS

CN    1128372 A    8/1996

OTHER PUBLICATIONS

Word—Office.com. Tips, tricks, and problem-solving for tables. Retrieved Date: Jun. 21, 2011. http://office.microsoft.com/en-us/word-help/tips-tricks-and-problem-solving-for-tables-HA001187617.aspx.
Design View—Features | JFormDesigner—Java/Swing GUI Designer. Retrieved Date: Jun. 22, 2011. http://www.formdev.com/jformdesigner/features/design-view.
"First Office Action and Search Report Received for Chinese Patent Application No. 201210313030.9", Mailed Date: Oct. 8, 2014, 14 Pages.
"Second Office Action Issued in Chinese Patent Application No. 201210313030.9", Mailed Date: Jun. 19, 2015, 6 Pages.

\* cited by examiner

*Primary Examiner* — Kavita Padmanabhan
*Assistant Examiner* — Tionna Burke
(74) *Attorney, Agent, or Firm* — Jessica Meyers; Tom Wong; Micky Minhas

(57) ABSTRACT

Embodiments are provided that include the use of an underlying grid structure as part of managing table operations and/or animation visualizations, but are not so limited. A method of an embodiment uses an underlying grid structure as part of an animation control reference or guide to provide table visualizations for display, including using one or more table borders and aspects of a reference grid column or row as part of controlling table features. A system of one embodiment includes a table manager to manage table actions and a grid manager to manage an underlying grid structure based in part on associated table actions and/or animations. Other embodiments are also disclosed.

20 Claims, 15 Drawing Sheets

UNDERLYING GRID STRUCTURE AND ANIMATION OF TABLES

BACKGROUND

Tables and tabular data provide useful analysis tools that can be used for a variety of end uses as part of providing varying levels and types of information. Tables can be of different shapes and sizes, implying that the ability to change the look and feel of tables is important to users. Unfortunately, manipulating tables is often found to be frustrating and unintuitive. Some word processing applications provide table functionality that allows users to use and modify existing table types or create custom tables. However, while some existing word processing applications provide a user with some ability to manipulate table structure, using such functional ability can result in undesirable table structures that may include highly irregular and often undesired display characteristics.

Using current table features when attempting to manipulate a complex table display is rather unintuitive, due in part to the complex nature of certain table structures. The unintuitive process often restricts achieving a desired result, which can be frustrating, leading to inefficiencies for the end-user. Simple actions, such as insert and delete actions for example, can create broken tables that are difficult, if not impossible, to correct, frustrating the user experience. For example, a current method used to delete a column in the middle of a complex table operates to delete an entire cell out of every row of the column. As a result, the operation creates a jagged or broken looking table because some of the deleted cells were bigger or smaller than others. Users are more likely to use an application that provides an efficient, controllable, and desirable user experience.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided that include the use of an underlying grid structure as part of managing table operations and/or animation visualizations, but are not so limited. A method of an embodiment uses an underlying grid structure as part of a table action and/or an animation control reference or guide to provide table visualizations for display, including using one or more existing table borders and aspects of a reference grid column or row as part of controlling table features. A system of one embodiment includes a table manager to manage table actions and a grid manager to manage an underlying grid structure based in part on associated table actions and/or animations. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments include the use of motion or animation visualizations as part of providing interactive features associated with complex table structures that include both regular and irregular row and/or column structures, but the embodiments are not so limited. Animation visualizations, including the use of motion, size, color, and/or shading, can assist to guide a user, provide real time feedback, and add realism to interactions. Motion can be used to provide fluid and compelling transformations without jarring and unpredictable interactions. As described below, an underlying grid structure can be used in part to manage table actions including controlling animation visualization operations. In one embodiment, the underlying grid structure can be used in part to maintain a table as perfectly rectangular, including maintaining all vertical relationships between inserted/deleted cells in different rows, and provide a consistent definition for what should occur regardless of the type of table or the size of a particular table cell or cells.

Figure 1:
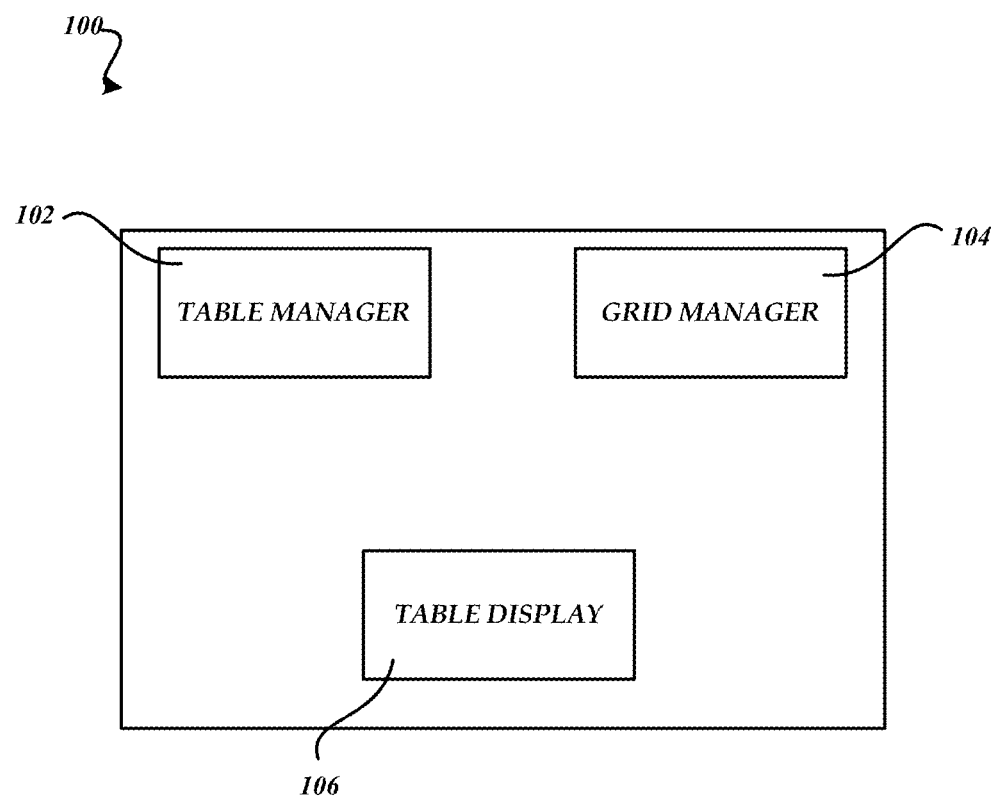
FIG. 1 is a block diagram of an exemplary computing system.

FIG. 1 is a block diagram of an exemplary computing system 100, but the embodiments are not so limited. While one exemplary computing system 100 is shown, it will be appreciated that a networked system can include many types of components, features, and functionality, and the described embodiments are not intended to limit the disclosure. The exemplary system 100 includes processing, memory, and other components. For example, the exemplary computing system 100 can be representative of functionality of a handheld device, such as a smartphone for example, a laptop device, a tablet device, a desktop system, or some other device/system.

As shown in FIG. 1, the exemplary system 100 includes a table manager 102, a grid manager 104, and a table display 106, but is not so limited. The table manager 102 is configured to use control inputs in part to manage table actions, including using information provided by the grid manager 104 in part to control a table action and/or associated animation and/or visualization in providing a table display 106. The grid manager 104 is used in part to provide grid-related information based in part on information provided by the table manager 102. For example, components of the system 100 can be used in conjunction with a word processing application to manage table-related operations as part of providing table management features for the word processing application. Components of the system 100 can be included as add-in features or integrated with functionality of an associated application, such as a word processing, spreadsheet, drawing, or other computer application.

As described further below, the table manager 102 can use various control inputs as part of providing the table display 106 including using animation and other visualization features. For example, the table manager 102 can use different types of animations to represent different types of table actions, such as insertion, deletion, move, and/or other table actions. The grid manager 104 can be used to generate and manage aspects of an underlying grid structure that is associated with a table structure. In an embodiment, the grid manager 104 is configured to generate an underlying grid structure based in part on corresponding table borders, including expanding all interior semi-bound and unbound table borders in part to generate the underlying grid structure.

The grid manager 104 can be used in part to provide grid information to the table manager 102, including information that can be used as animation constraints by the table manager 102 in part to manage and control table actions and/or animations and/or other visualizations. In an embodiment, based in part on a table selection and/or table action, the grid manager 104 can pass information associated with one or more grid borders including dimensional constraints of a grid row or column. The table manager 102 of an embodiment operates to manage a table action based in part on a table selection point (e.g., outside or inside of a table) and one or more table borders that coincide with or correspond to one or more underlying grid borders. As described below, underlying grid information can be used in part to control and/or guide table actions and provide fluid and visually informative table animation visualizations. The underlying grid information can be used to determine how a table changes as a result of an action and the animation or animations used to help a user understand a change. The underlying grid information informs a table change operation that can be visualized using one or more animations to display a resulting change or changes.

The functionality described herein can be used by or part of a client application, web-based or virtual application, an operating system (OS), file system, web-based system, hosted, or other computing system or device, but is not so limited. In one embodiment, the system 100 can be communicatively coupled to a file system, virtual web, network, and/or other information/communication sources. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described herein, it will be appreciated that other numbers and/or types and/or configurations can be included according to various embodiments. Accordingly, component functionality can be further divided and/or combined with other component functionalities according to desired implementations.

Figure 2A:
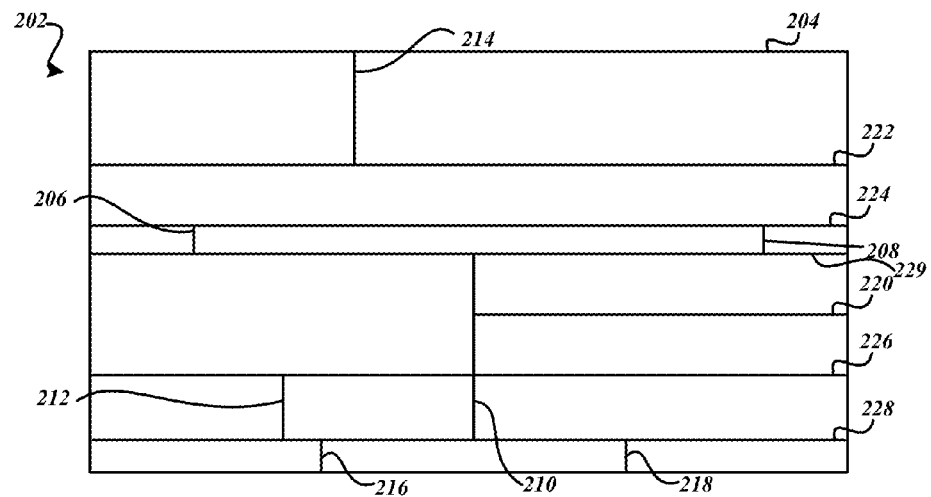
FIGS. 2A-2C illustrate generation and/or association of an exemplary underlying grid structure and an associated exemplary table.
Figure 2B:
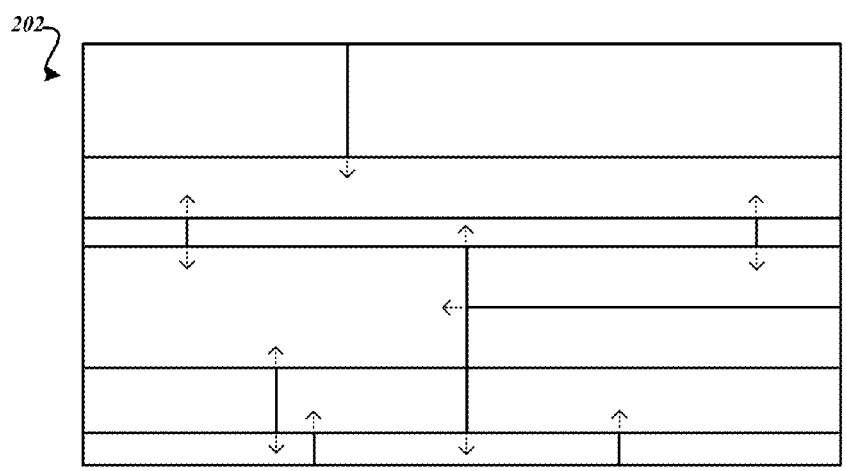
Figure 2C:
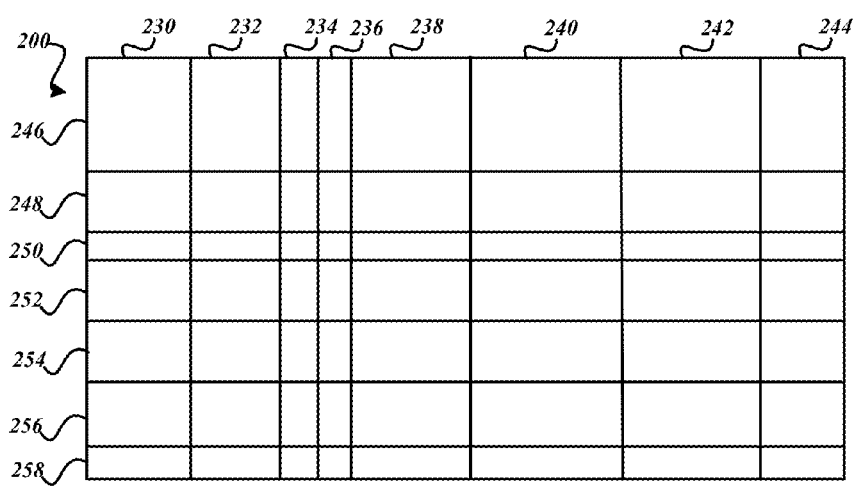

FIGS. 2A-2C illustrate generation and/or association of an underlying grid structure 200 and an associated exemplary table 202. As shown in FIG. 2A, the table 202 includes a number of borders, including an outer table border 204, and a number of interior table borders contained within the outer table border 204. As used herein, unbound interior table borders refer to interior borders that do not extend or couple to the outer table border 204, such as unbound interior vertical borders or portions or boundaries 206, 208, 210, and 212. While no unbound interior horizontal borders are included in the exemplary table 202, it will be appreciated that other table structures may include one or more unbound interior horizontal borders.

Semi-bound interior table borders refer to interior borders or portions that include an end coupled to the outer table border 204, such as semi-bound interior vertical borders 214, 216, and 218, and semi-bound interior horizontal border 220. Bound interior borders refer to interior borders where both endpoints couple to the outer table border 204, such as bound horizontal borders 222, 224, 226, 228, and 229. While no bound interior vertical borders are included in the exemplary table 202, it will be appreciated that other table structures may include one or more bound interior vertical borders.

FIG. 2B illustrates how the underlying grid structure 200 is defined/constructed/configured based on the table structure of exemplary table 202. The dotted line horizontal and vertical directional arrows are shown to graphically illustrate how the table structure of exemplary table 202 is used to define the underlying grid structure 200. The generation of the underlying grid structure 200 can be described as extending all unbound and semi-bound interior table borders to span opposing outer table borders. Another way to generate the underlying grid structure 200 can be described as replacing each unbound and semi-bound border with a bound border to define the underlying grid structure 200.

FIG. 2C depicts the defined underlying grid structure 200 for the current table 202. As structural aspects of the exemplary table 202 change, corresponding changes are made to the underlying grid structure 200 as described below. Thus, the underlying grid structure 200 is structurally altered by certain table actions that affect the table structure since the underlying grid structure 200 provides an underlying reference of a table's current structure as well as for future table actions. As described above, the underlying grid structure 200 can be used as a reference for various table actions as well as an animation control reference or guide. For example, the underlying grid structure 200 can be used as a control reference when managing a table display and animating column/row insertion actions, column/row deletion actions, column/row move actions, resizing cells, columns, rows, an entire table, etc.

As shown, the underlying grid structure 200 includes bound interior horizontal grid borders and bound vertical grid borders which correspond to the bound, unbound, and semi-bound interior borders of the exemplary table 202. The defined underlying grid structure 200 includes a number of grid columns 230-244 and grid rows 246-258 which are used in part to control and manage user interactions and/or animations with the exemplary table 202. In an embodiment, the underlying grid structure 200 is not displayed for the user but can be toggled "on/off" using a table action interface (e.g., ribbon button). As described further below, the rectangular structure of the grid rows and columns can be used for guide, selection, and/or animation cues and/or constraints. For example, aspects of an underlying grid structure can be used as part of guiding actions and/or operations and/or determining a result of a table action. As described below, operations/actions performed on the exemplary table 202 can result in structural changes to the underlying grid structure 200.

Figure 3:
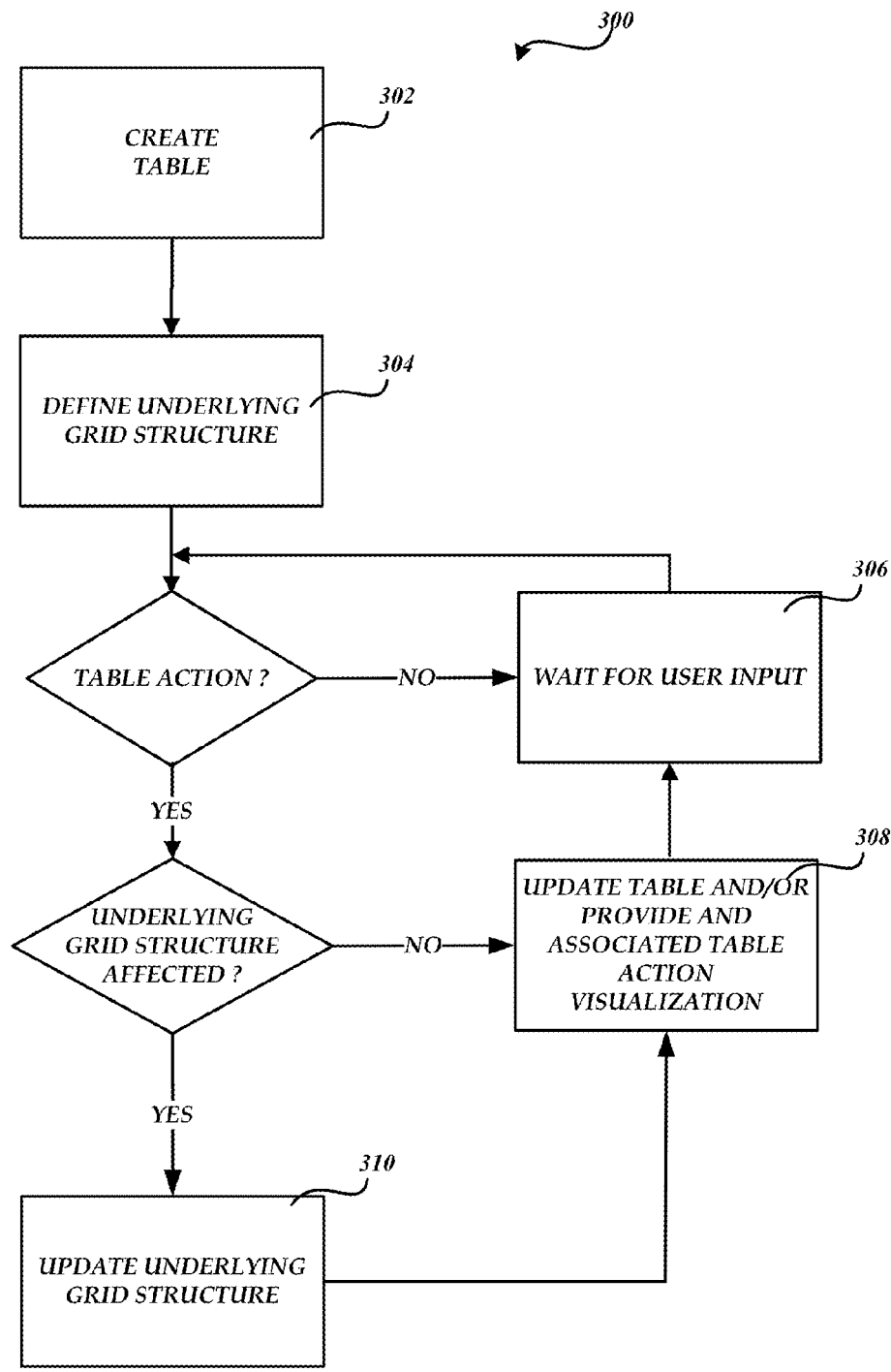
FIG. 3 is a flow diagram illustrating an exemplary process that includes the use of table management and animation features including the use of an underlying or associated grid structure.

FIG. 3 is a flow diagram illustrating an exemplary process 300 that includes the use of table management and animation features including an underlying or associated grid structure. In an embodiment, the process 300 is used as part of managing and/or controlling table actions and animations and/or other visualizations as a result of the table action, but is not so limited. For example, the process 300 can use dimensions and/or boundaries of an underlying grid structure in part to control a display of a table selection action or the result of another action upon the table such as an insertion, deletion, or movement of a column or row, including the corresponding animations as part of providing table visualizations to an end user.

At 302, the process 300 of an embodiment operates to create and/or use a table. For example, a user using a word processing application can use control inputs to create a new table and/or customize an existing table. At 304, the process 300 operates to define an underlying grid structure based on table borders including one or more unbound and/or semi-bound table borders to generate the underlying grid structure, but is not so limited. An underlying grid structure can change as an associated table evolves/changes. An underlying grid structure can be pre-defined for default and/or other provisioned table structures. For example, the process 300 can be used as part of managing table operations associated with a word processing or other application including using an underlying grid structure as part of controlling and/or guiding a table action and/or associated animation visualizations to prevent broken and other undesirable table structures.

Based in part on control input (e.g., user interaction), if the input operation is not a table action, the process 300 proceeds to 306 and waits for user input associated with a table action. When a user input occurs, it is judged whether or not this input is an action that affects the underlying grid structure. If the input operation is associated with a table action that does not create or otherwise alter the underlying grid structure then the process 300 proceeds to 308. If the input operation is associated with a table action that creates or otherwise alters the underlying grid structure the flow proceeds to 310.

At 308, the process 300 operates to update the table and/or provide an associated table action visualization and/or animation sequence based in part on the type of table action (e.g., selection, insertion, deletion, move, resize, etc.). For example, the process 300 at 308 can be configured to provide different animation visualizations depending in part on the type of table action and/or the use of one or more underlying grid constraints (e.g., a grid border, grid column, grid row, etc.) to provide graphical interactive table visualizations to end-users. As described above, the grid structure helps determine what the table display will be after an action including how the table reacts to the user actions.

In an embodiment, coincident unbound and/or semi-bound table borders and one or more underlying grid borders and/or dimensions are used in part to control an animation and/or animation progression, such as a column deletion animation sequence as compared to a column insertion animation sequence, as described further below. If the table action affects the underlying grid structure, at 310 the process 300 operates to update the grid structure based in part on the corresponding table action and proceeds to 308. As part of providing certain interactive table features and functionality, the process 300 can manipulate and/or update an underlying grid structure before translating corresponding changes back to the table being displayed and/or interacted with.

It will be appreciated that processing and/or networking features can assist in providing responsive interactive features. Aspects of the process 300 can be distributed to and among other components of a computing architecture, and client, server, and other examples and embodiments are not intended to limit features described herein. While a certain number and order of operations is described for the exemplary flow of FIG. 3, it will be appreciated that other numbers and/or orders of operations can be used according to desired implementations.

Figure 4A:
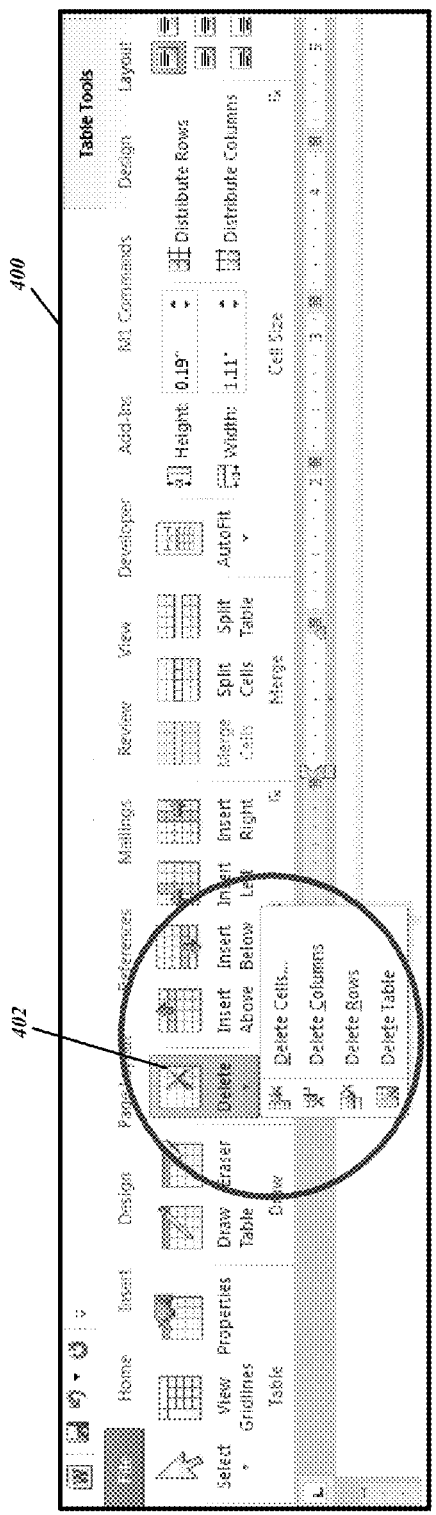
FIGS. 4A-4D depict exemplary user interfaces that provide a number of table actions.
Figure 4B:
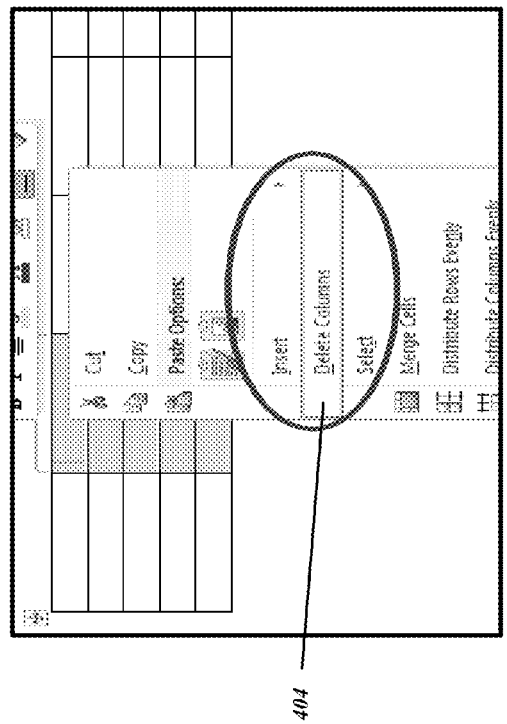

FIGS. 4A-4D depict exemplary user interfaces that provide a number of table actions. When activated, certain table actions affect the table structure and underlying grid structure. As shown in FIG. 4A, the ribbon tool 400 includes a delete interface 402. The delete interface 402 operates in part to provide a number of available table deletion operations including a delete cells action, a delete columns action, a delete rows action, and a delete table action. FIG. 4B depicts a drop-down interface 404 that includes a delete columns table action.

Figure 4C:
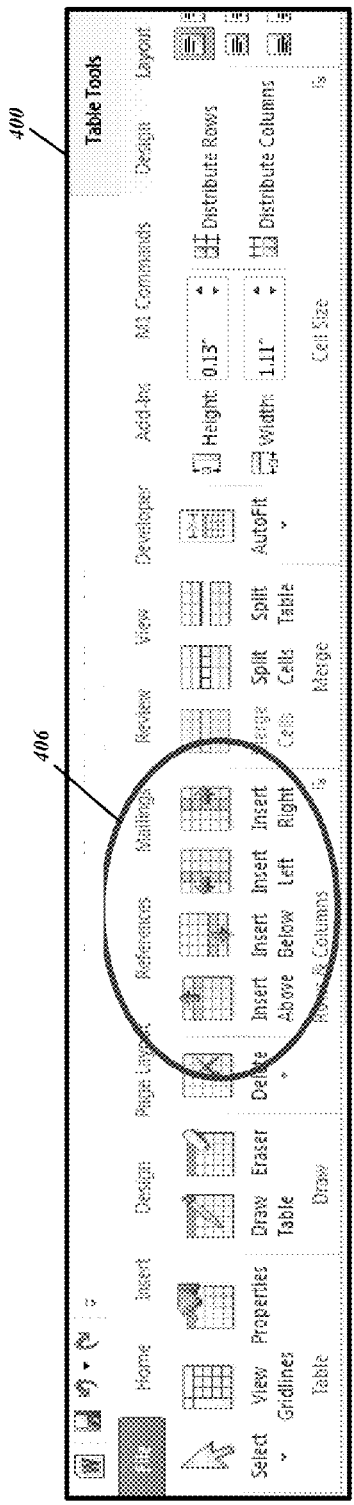
Figure 4D:
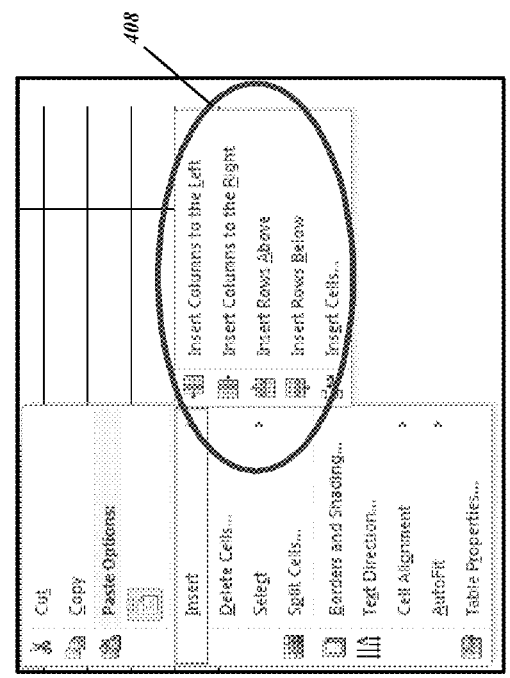

As shown in FIG. 4C, the ribbon tool 400 also includes a table insertion interface 406. The table insertion interface 406 operates in part to provide a number of available table insertion actions including an insert row(s) above action, an insert row(s) below action, an insert column(s) to the left action, and an insert column(s) to the right action. FIG. 4D depicts a drop-down interface 408 that includes an insert column(s) to the left action, an insert column(s) to the right action, an insert row(s) above action, an insert rows below action, and an insert cells action.

Figure 5A:
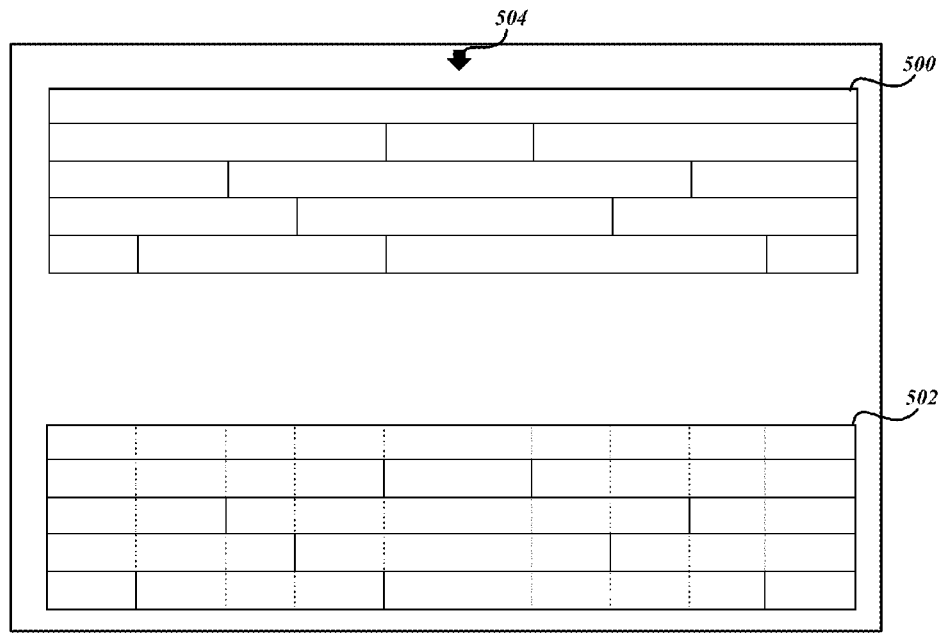
FIGS. 5A-5E illustrate examples of a column selection action.

FIGS. 5A-5E illustrate examples of column selection actions. As described above, an underlying grid structure can be used in part to control an associated selection animation or visualization. Assume for the examples below that a table manager component is in communication with a grid manager component, passing information back and forth as part of providing table management features. FIG. 5A depicts a table 500 for display and a composite rendering 502 that depicts the table and an associated underlying grid structure. The dotted extension lines of the composite rendering 502 illustrate how the unbound and semi-bound table borders have been expanded to define bound interior grid borders. For this example, unbound and semi-bound interior vertical borders have been used in part to define the underlying grid structure. As shown in FIG. 5A, a user input device (shown by the downward arrow 504) is hovering centrally over an upper table border. The vertical pointing (downward) arrow provides an indication to the user of a column selection action.

Figure 5B:
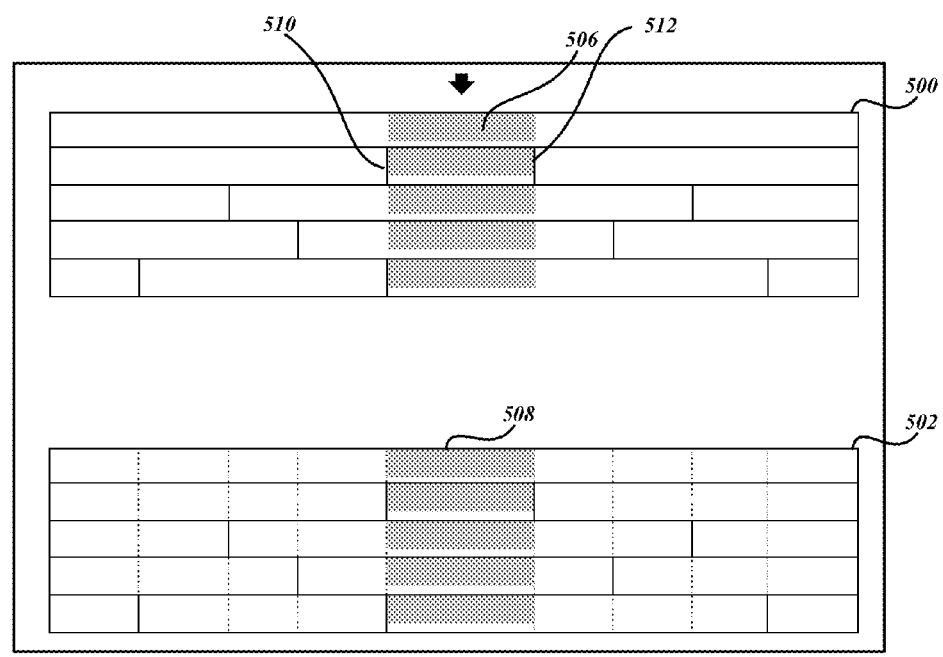

FIG. 5B depicts the table 500 after a user has interacted with the table (e.g., clicked, tapped, etc.) which operated to select a table column as shown by an animation area or portion 506. In one embodiment, an animation function can be used in conjunction with aspects of the underlying grid structure to control the visualization of an animation on an associated table such as by using an animation decay or acceleration function or formula as examples. For example, an animation function can be used to control the selection visualization by, gradually, instantaneously, or at some accelerated or decaying rate, filling each portion of the now animated table column from the top to bottom using animation highlighting for the entire column.

As described above, the underlying grid structure can be used in part to control and manage a table action. For this example, based on the selection point, the rectangular dimensions of underlying grid column 508 are used in part to define and/or control the visual aspects of the selection, including animating the animation area 506 of the table 500 according to the dimensions of the underlying grid column 508, as displayed in the table 500 to the user. Again, the underlying grid structure and the composite rendering 502 are not typically shown to the user.

Figure 5C:
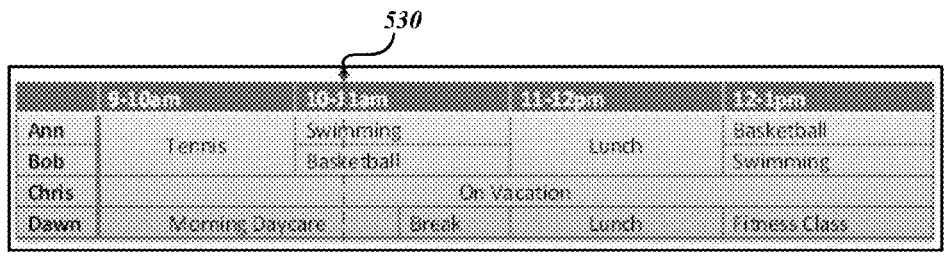
Figure 5D:
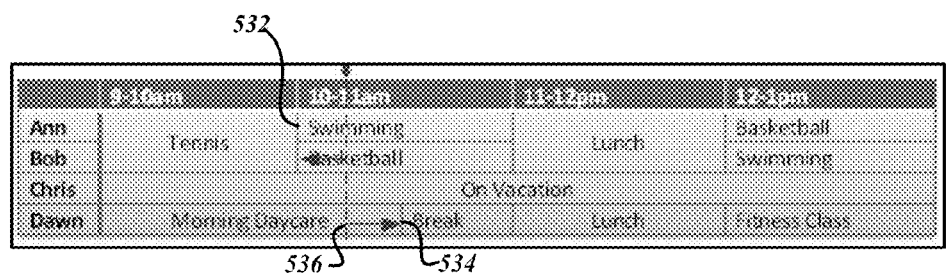
Figure 5E:
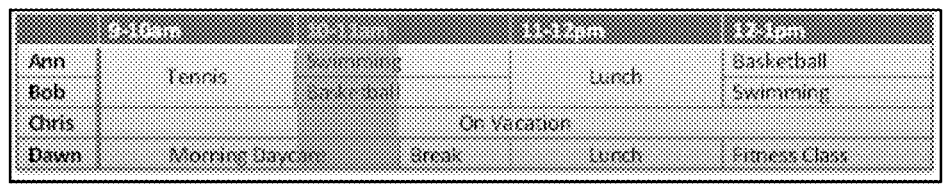

As shown in FIGS. 5C-5E, and according to one embodiment, a user selection is defined in part by the insertion point or input device location (e.g., quantified by downward arrow 530) position and the nearest interior vertical borders 532 and 534 relative to an imaginary line 536 extending vertically through the table from the downward arrow. The associated underlying grid column coinciding with interior vertical borders 532 and 534 can be used to provide dimensions of selection and/or other table visualizations.

Figure 6A:
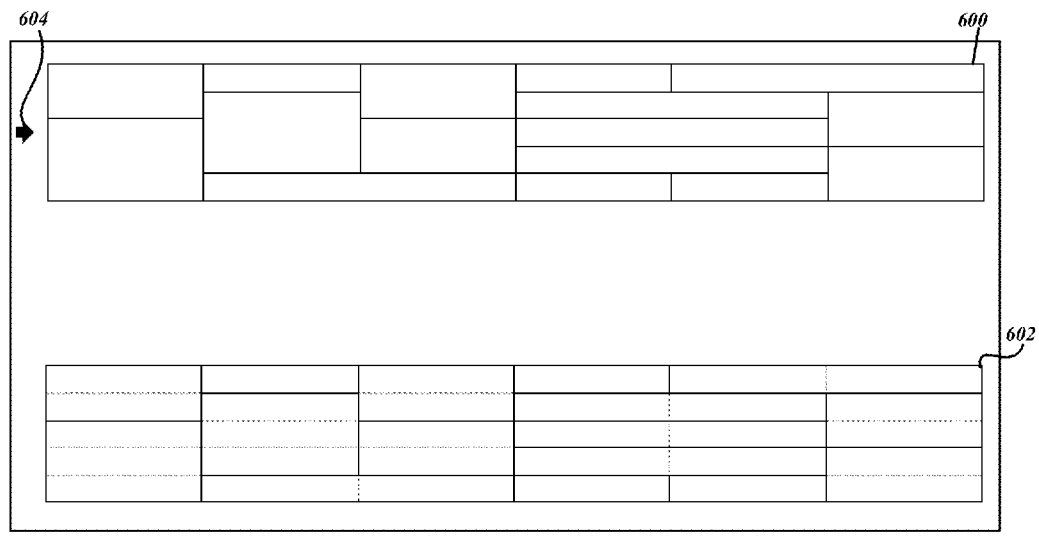
FIGS. 6A-6B illustrate examples of a row selection action.
Figure 6B:
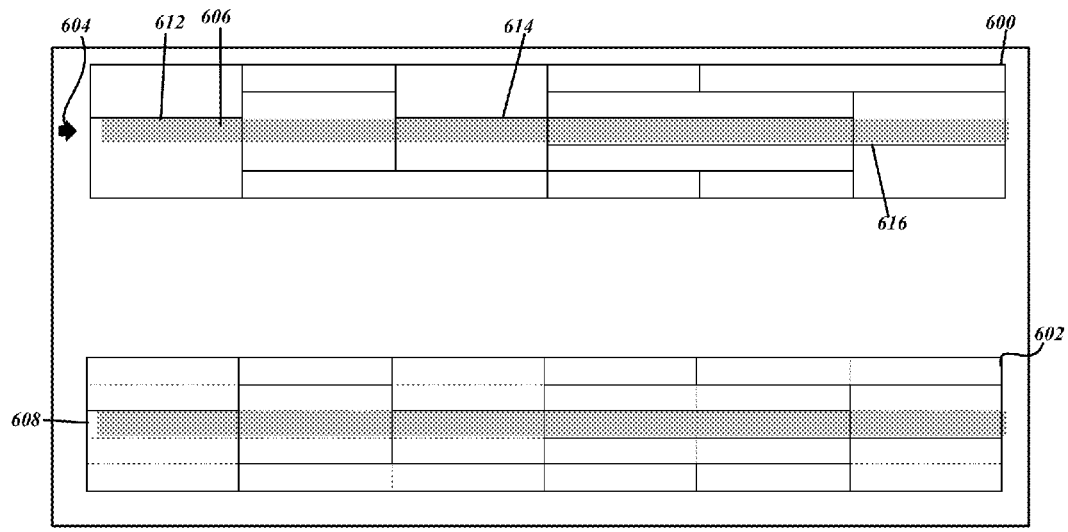

FIGS. 6A-6B illustrate examples of a row selection action based in part on the use of an underlying grid structure to control an associated selection and/or animation. FIG. 6A depicts a complex table 600 for display and a composite rendering 602 that depicts the table and an associated underlying grid structure. The dotted extension lines of the composite rendering 602 illustrate how the unbound and semi-bound table borders have been expanded to define bound interior grid borders. For this example, unbound and semi-bound interior vertical borders as well as unbound and semi-bound interior horizontal borders have been used in part to define the underlying grid structure. As shown in FIG. 6A, a user input device (shown by the right-pointing arrow 604) is hovering outside of the outer table border. The horizontally pointing arrow (to the right) provides an indication to the user of a row selection action.

FIG. 6B depicts the table 600 after a user has interacted with the table (e.g., clicked, tapped, etc.) which operated to select a table row as shown by an animation area or portion 606. As described above, an animation function can be used in conjunction with aspects of the underlying grid structure to control the visualization of an animation on an associated table such as by using an animation decay or acceleration function or formula as examples. A corresponding underlying grid structure can be used in part to control and manage a visualization associated with the table action. For this example, based on the selection point, the rectangular dimensions of underlying grid row 608 are used in part to define and/or control the visual aspects of the selection, including animating the animation area 606 of the table 600 according to the dimensions of the underlying grid row 608.

In one embodiment, the user selection and/or animation can also be defined in part by the insertion point or input device location (e.g., quantified by arrow 604 position) and the nearest interior horizontal borders relative to an imaginary line extending horizontally through the table from arrow 604 (i.e., semi-bound horizontal table border 612 or unbound horizontal table border 614 with semi-bound horizontal table border 616 for this example) to calculate animation area. Again, the underlying grid structure and the composite rendering 602 are not typically shown to the user.

FIGS. 7A-7D illustrate examples of a column insertion action based in part on the use of an underlying grid structure to control the insertion action and guide the associated insertion animation. Assume for the examples that a table manager component is managing the table 700 and a grid manager component is managing an associated underlying grid structure. Row insertion actions can be applied using similar logic and the associated underlying grid structure. The insertion visualization of an embodiment splits the table at a location of an insertion action to define two separate table chunks that animate by sliding apart according to an expansion algorithm (e.g., on a left-justified table, the left chunk remains stationary as the right chunk slides in some fashion to the right). Once sufficiently separated, the insertion action results in a new column smoothly fading into the separation as part of the insertion animation.

Figure 7A:
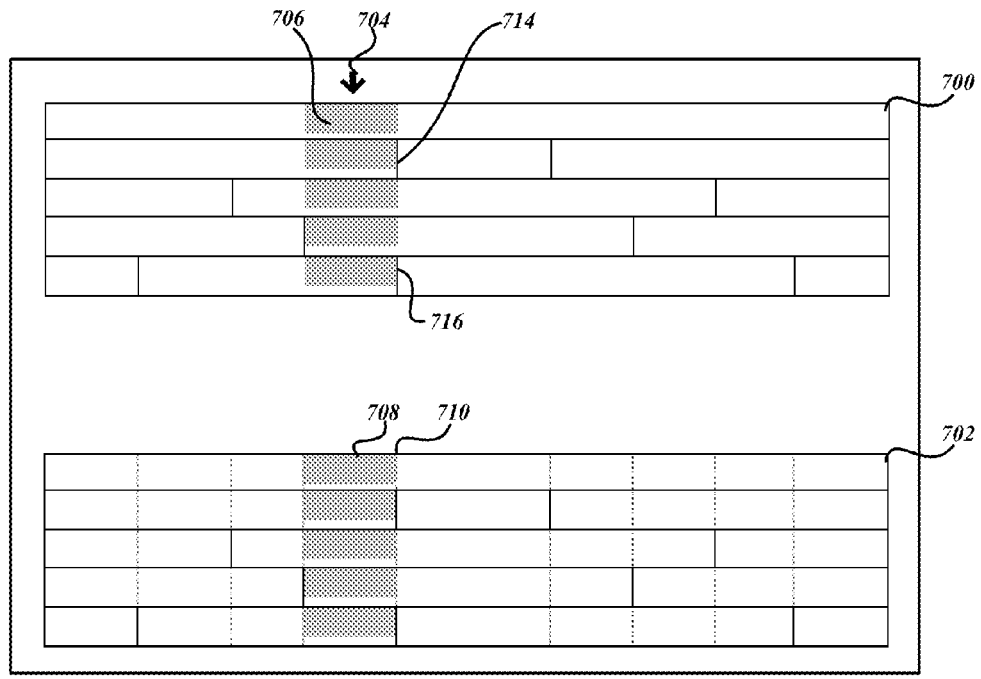
FIGS. 7A-7D illustrate examples of a column insertion action based in part on the use of an underlying grid structure.

FIG. 7A depicts a table 700 for display and a composite rendering 702 that depicts the table and an associated underlying grid structure. The dotted extension lines of the composite rendering 702 illustrate how the unbound and semi-bound table borders have been expanded to define bound interior grid borders. As shown in FIG. 7A, a user input device location (shown by the downward arrow 704) is shown that is associated with a column selection operation as part of a defined column insertion operation (e.g., "insert column to the right" table action). For example, a user input action can be monitored by a table manager to detect that a user is hovering above and adjacent to the top table border which changes the insertion pointer from a default object to the arrow object.

The column insertion operation uses the selected column (shown by animated area 706) and associated insertion animation logic in part to control the column insertion table action and associated animation or animation progression. In one embodiment, the animated area 706 can be positioned to the right of table borders 714 and 716 (based on the underlying grid border 710) to provide a visual cue as to which parts of the table 700 will be affected by the column insertion operation.

As described above, the underlying grid structure can be used in part to control and manage a table action and guide the associated visualization, such as the exemplary column insertion action of FIGS. 7A-7D. Again, based on the selection location, the rectangular dimensions of underlying grid column 708 can be used in part to define and/or control a table action and associated visual and physical aspects of an insertion animation. Thus, according to an embodiment, insertion of column elements and/or column space using the geometric constraints of the underlying grid column 708 is translated back into the table 700 for display. Thus, the geometry of the underlying grid column 708 can be used as an animation constraint when animating the column insertion action.

Figure 7B:
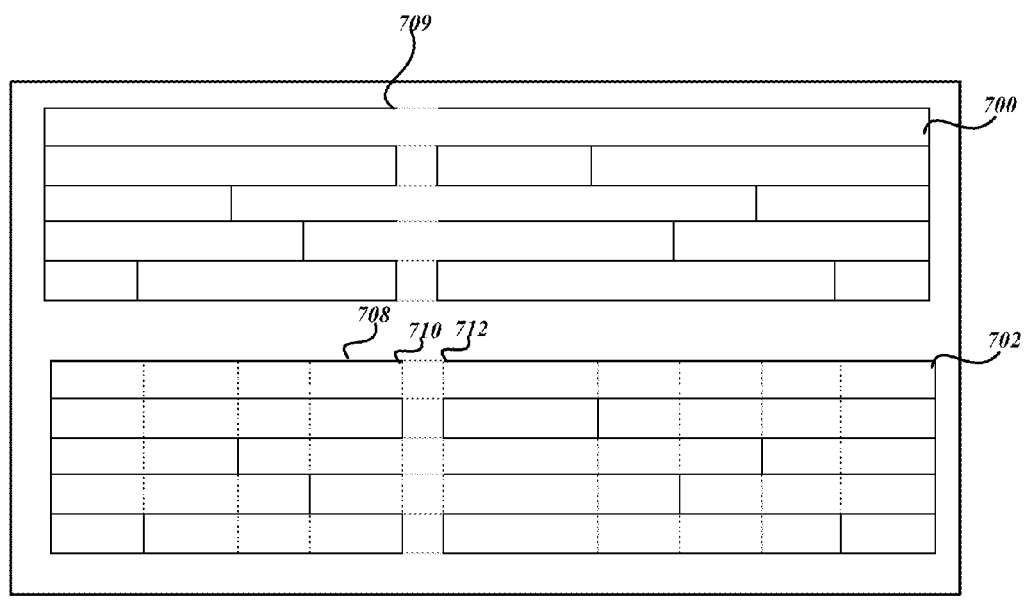
Figure 7C:
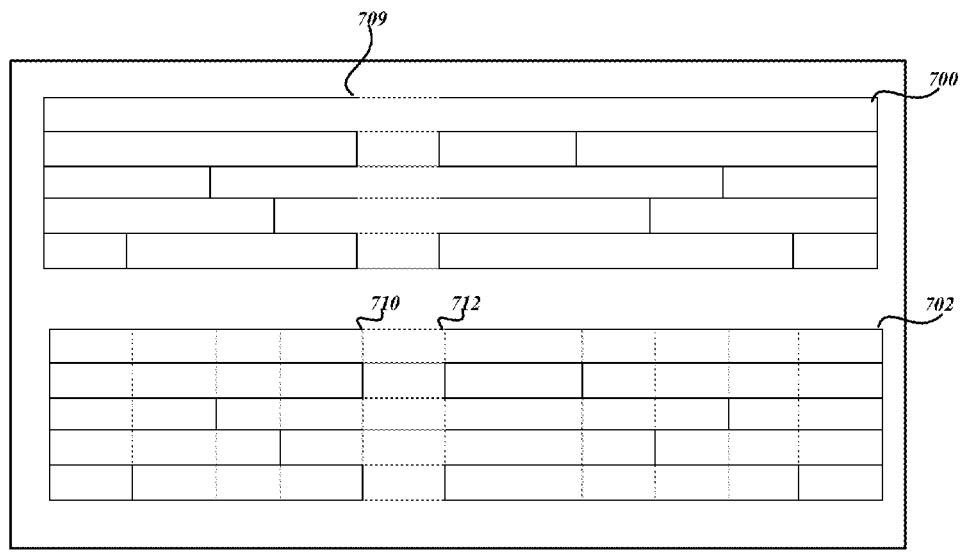
Figure 7D:
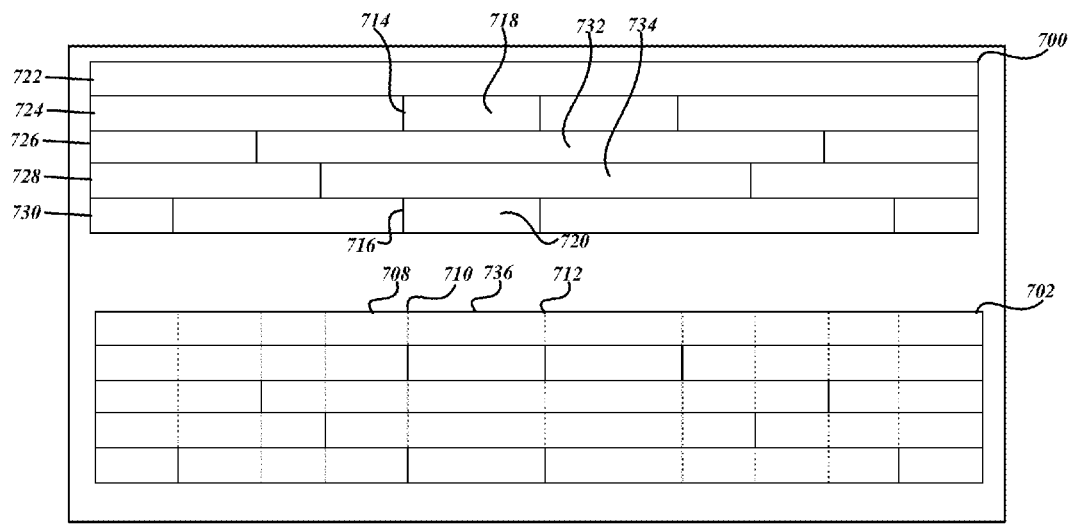

As shown in FIG. 7B, the column insertion animation can begin with the table 700 separating at table portion 709 coinciding with the grid border 710 of the underlying grid column 708 by a first amount denoted by the separation up to grid border 712. FIG. 7C depicts a subsequent growth step associated with the column insertion animation as grid border 712 moves further away from grid border 710, but less than the width of the underlying grid column 708, the amount being translated back to table 700. FIG. 7D depicts the table 700 after the column insertion operation and associated animation is complete.

As shown in FIG. 7D, the column insertion animation resulted in grid border 712 moving a distance from grid border 710 that is equal to the width of the underlying grid column 708. Moreover, the table 700 is now larger in width, yet remains structurally rectangular. Looking more closely, and according to an embodiment of the column insertion action, new column portions 718 and 720 have been inserted to the right of table borders 714 and 716 which coincide with grid border 710.

Thus, for this example, new table columns 718 and 720 are inserted to the right of table cells having a border that coincides with reference grid border 710 since the operation is inserting a column to the right. The underlying grid structure also includes a new grid column 736 coinciding with new table cells 718 and 720. Note also that the insert column to the right operation did not result in new cells being added to rows 722, 726, and 728, due in part to no other coincident table borders relative to reference grid border 710.

For this example, the column insertion operation resulted in table row 722 expanding in an amount equal to the width of the underlying grid column 708 since table row 722 includes no vertical border that coincides with grid border 710. Table row 724 includes new cell 718 having a width equal to the width of underlying grid column 708 since table row 724 includes interior table border 714 that coincides with grid border 710.

The column insertion operation resulted in cells 732 and 734 of table rows 726 and 728 expanding in an amount equal to the width of the underlying grid column 708 since table rows 726 and 728 include no vertical borders that coincide with grid border 710 (i.e., no new cell added to either row). Table row 730 includes new cell 720 having a width equal to the width of underlying grid column 708 since table row 730 includes interior vertical border 716 that coincides with grid border 710. In other embodiments, the width of any new column can be of different sizes dependent in part on a particular implementation of the insertion logic and parameters.

Animation of the space and/or column insertion operation can be based in part on the dimensions of the underlying grid column 708 and/or any expansion algorithm that controls the visualization of the column expansion and/or insertion process. Again, the underlying grid structure and the composite rendering 702 are not typically shown to the user. In an embodiment, an expansion animation function can be used in conjunction with aspects of the underlying grid structure to control the visualization of an insertion animation of an associated table. For example, an animation function can be used to control the column insertion visualization by, gradually, instantaneously, and/or at some accelerated or constant expansion rate, opening the area associated with the additional space and/or new column location for the entire column.

FIGS. 8A-8D illustrate examples of a column insertion action for table 800. The column insertion action is based in part on the use of an underlying grid structure in part to control an associated insertion animation when the insertion point 802 is inside of the table 800. Assume for the examples that a table manager component is managing the table 800 and a grid manager component is managing the underlying grid structure. Row insertion actions can be applied using similar logic and the associated underlying grid structure.

Figure 8A:
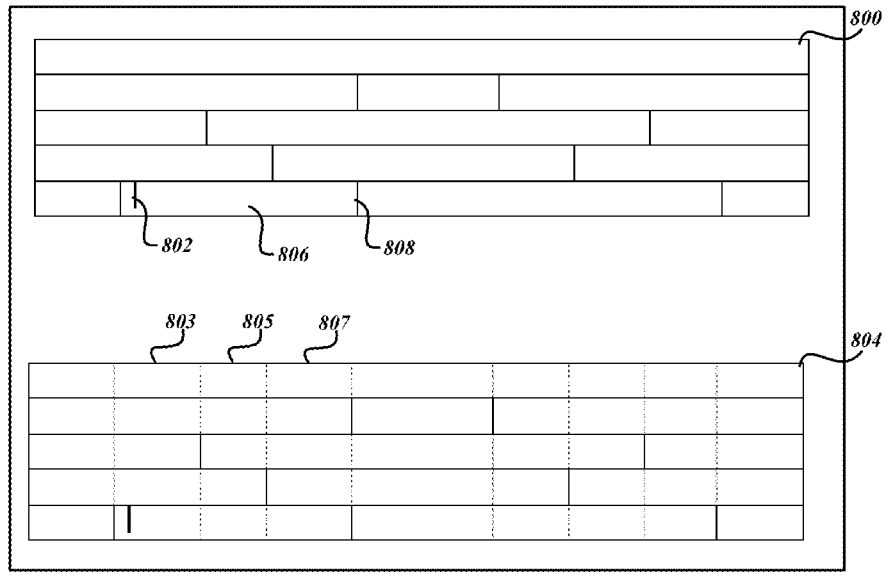
FIGS. 8A-8D illustrate examples of a column insertion action based in part on the use of an underlying grid structure.

FIG. 8A depicts table 800 for display and a composite rendering 804 that depicts the table and an associated underlying grid structure. The dotted extension lines of the composite rendering 804 illustrate how the unbound and semi-bound table borders have been expanded to define bound interior grid borders. For this example, since the insertion point 802 is located in table cell 806 when the user decided to insert a column to the right, the dimensions of the table cell 806 are used to determine the resulting dimensions of table structure after the insertion operations is complete. In an embodiment, a visual selection indication can also be rendered in the table (see FIG. 7A) to highlight the underlying grid column associated with the selection.

As shown in FIG. 8A, a user input device location (shown by line 802) is shown that is associated with a defined column insertion operation (e.g., "insert column to the right" table action). For example, a user input action can be monitored by the table manager to detect that a user has released the mouse or other input device while inside the table cell 806. The column insertion operation uses the selected table cell 806 in part to define the column insertion table action and associated animation or animation progression.

Figure 8B:
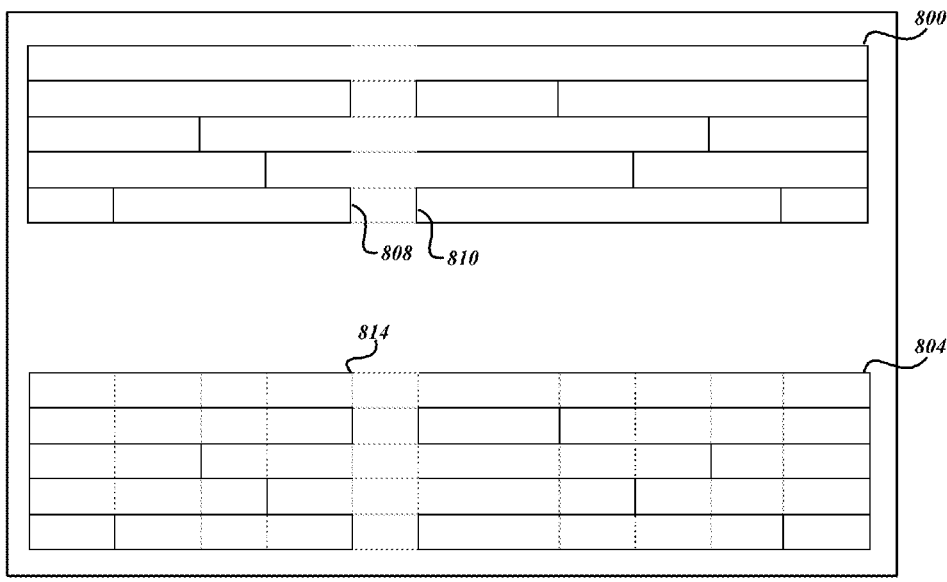
Figure 8C:
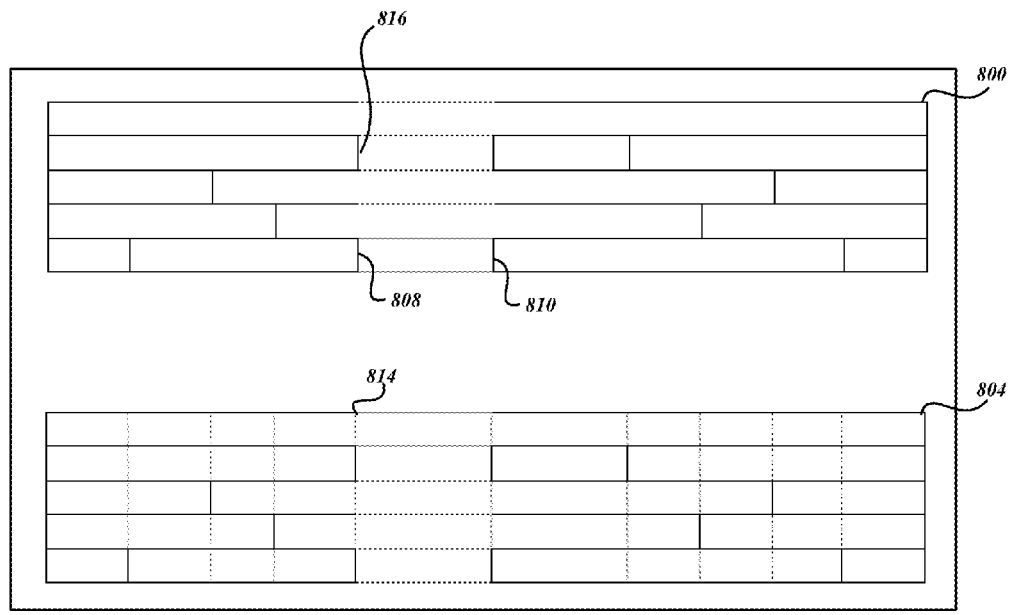
Figure 8D:
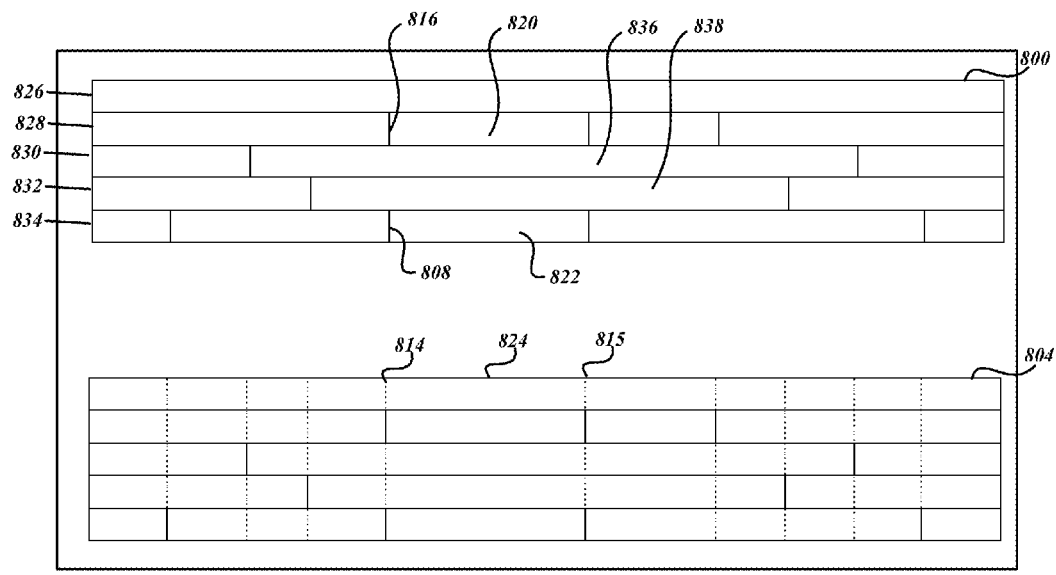

For example, the table cell 806 structure, or one or more grid columns associated therewith, can be used in part to control and manage a visualization associated with the exemplary column insertion action of FIGS. 8B-8D. As one example, the rectangular dimensions of table cell 806 (or of three grid columns 803, 805, and 807) can be used in part to define and/or control the visual aspects of the table insertion animation. The column insertion operation will result in manipulation of the table 800, including insertion of column elements and/or column space using the geometric constraints of the table cell 806 (or associated grid portion or portions) to facilitate the column insertion operation. Thus, the geometry of the table cell 806 can be used as an animation constraint when animating the column insertion action.

As shown in FIG. 8B, the column insertion animation begins with the table 800 separating at column border 808 (also at reference grid border 814) by a first amount denoted by the separation up to border 810. FIG. 8C depicts a subsequent growth step associated with the column insertion animation as border 810 moves further away from column border 808, but less than the width of the table cell 806. Notice that the underlying grid structure (as shown in the composite rendering 804) is also expanding to mirror the table action/animation. FIG. 8D depicts the table 800 after the column insertion operation and associated animation is complete, as shown by the resulting table structure.

As shown in FIG. 8D, the column insertion animation resulted in new grid border 815 spaced apart from reference grid border 814 in an amount equal to the width of the table cell 806 that was used in part to control the insertion operation and associated animation. Moreover, the table 800 is now larger in width, yet structurally has a uniform outer table border. Looking more closely, and according to an embodiment of the column insertion action from within the table 800, new column portions or cells are inserted to the right of table borders 808 and 816 which coincide with reference grid border 814.

For example, new table cells 820 and 822 can be inserted to the right of table cells having a border that coincides with the reference grid border 814 since the operation is inserting a column to the right. The underlying grid structure also includes a new grid column 824 coinciding with new table cells 820 and 822. Note also that the insert column to the right operation did not result in new cells being added to rows 826, 830, and 832, due in part to no other coincident table borders with reference grid border 814.

Also, according to this example, the column insertion operation resulted in table row 826 expanding in an amount equal to the width of the table cell 806 since table row 826 includes no vertical border that coincides with reference grid border 814. Table row 828 includes new cell 820 having a width equal to the width of table cell 806 since table row 828 includes table border 816 that coincides with reference grid border 814.

The column insertion operation resulted in cells 836 and 838 of table rows 830 and 832 expanding in an amount equal to the width of the table cell 806 since table rows 830 and 832 include no vertical borders that coincide with reference grid border 814 (i.e., no new column added to either row). Table row 834 includes new cell 822 having a width equal to the width of table cell 806 since table row 834 includes table border 808 that coincides with reference grid border 814. In other embodiments, the width of any new column can be of different sizes dependent in part on a particular implementation of the insertion logic and/or parameters.

Animation of the space and/or column insertion operations can be based in part on the dimensions of the table cell 806 (or aspects of the underlying grid structure) and/or any expansion algorithm that controls the visualization of the column expansion and/or insertion process. Again, the underlying grid structure and the composite rendering 804 are not typically shown to the user. In an embodiment, an expansion animation function can be used in conjunction with aspects of the underlying grid structure to control the visualization of an insertion animation on an associated table. For example, an animation function can be used to control the column insertion visualization by, gradually, instantaneously, and/or at some accelerated or constant expansion rate, opening the area associated with the additional space and/or new column location for the entire column.

FIGS. 9A-9D illustrate examples of a column deletion action based in part on the use of an underlying grid structure to control a deletion action and associated deletion animation. Assume for the examples that a table manager component is managing the table 900 and a grid manager component is managing an associated underlying grid structure. Row insertion actions can be applied using similar logic and the associated underlying grid structure.

Figure 9A:
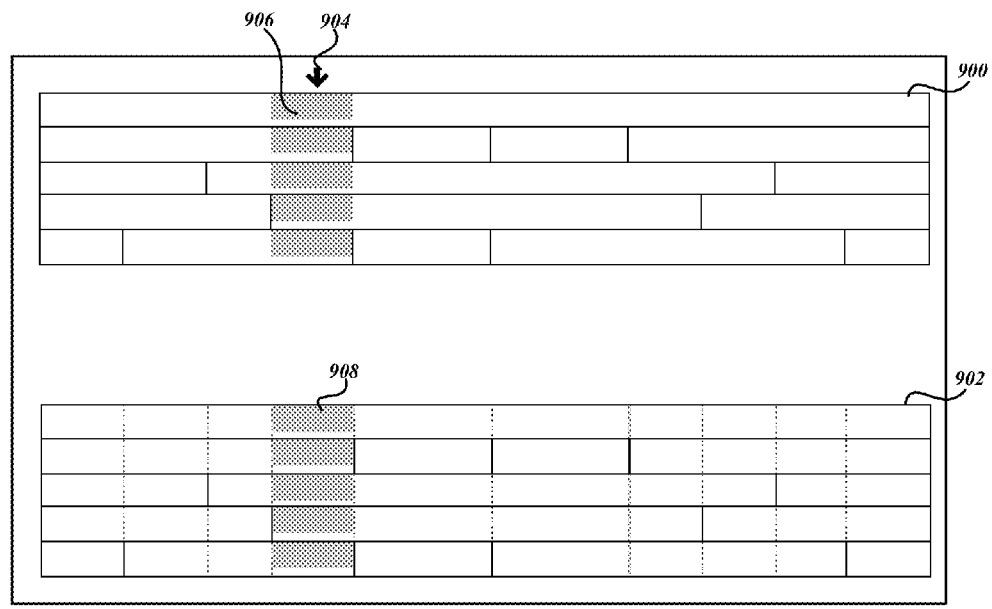
FIGS. 9A-9D illustrate examples of a column deletion action based in part on the use of an underlying grid structure.

FIG. 9A depicts a table 900 for display and a composite rendering 902 that depicts the table and an associated underlying grid structure. The dotted extension lines of the composite rendering 902 illustrate how the unbound and semi-bound table borders have been expanded to define bound interior grid borders. As shown in FIG. 9A, a user input device location (shown by the downward arrow 904) is shown that is associated with a column selection operation as part of a defined column deletion operation (e.g., "delete column to the right" table action). For example, a user input action can be monitored by the table manager to detect that a user is hovering above and adjacent to the top table border which changes the pointer from a default object to the arrow object.

The column deletion operation uses the selected column (shown by selected area 906), the underlying grid structure and an associated deletion animation to control the column deletion table action and associated animation or animation progression. The selected area 906 is based on the underlying grid column 908 which also provides a visual cue as to which parts of the table 900 are to be affected by the column deletion action. As described above, the underlying grid structure can be used in part to control and manage a visualization associated with a table action, such as the exemplary column deletion action of FIGS. 9A-9D.

Again, based on the selection location, the rectangular dimensions of underlying grid column 908 are used in part to define and/or control the visual aspects of the deletion animation. Thus, according to an embodiment, deletion of column elements and/or column space using the geometric constraints of the underlying grid column 908 is translated back into the table 900 for display. Thus, the geometry of the underlying grid column 908 can be used as an animation constraint when animating the column deletion action.

Figure 9B:
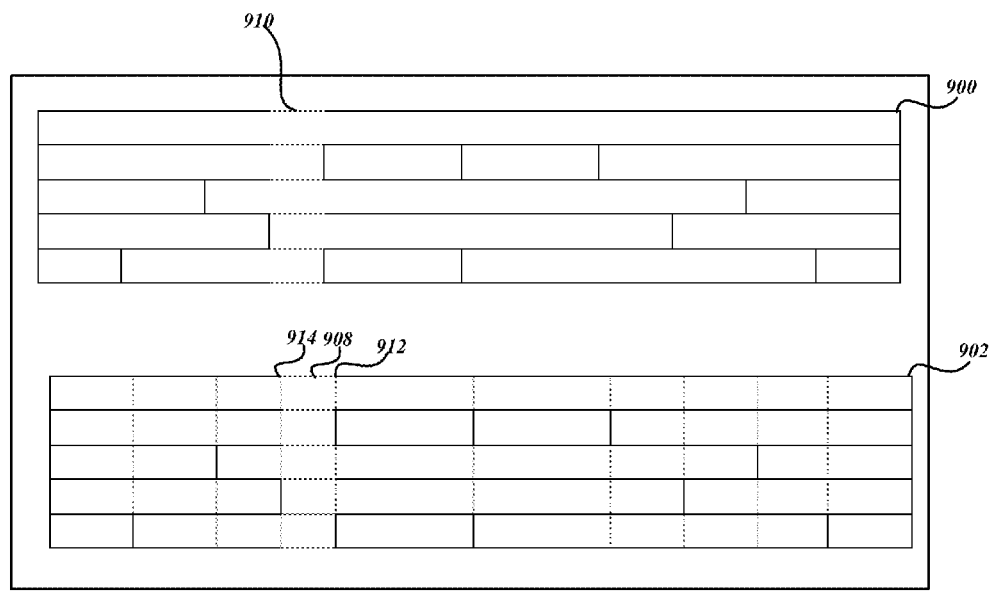
Figure 9C:
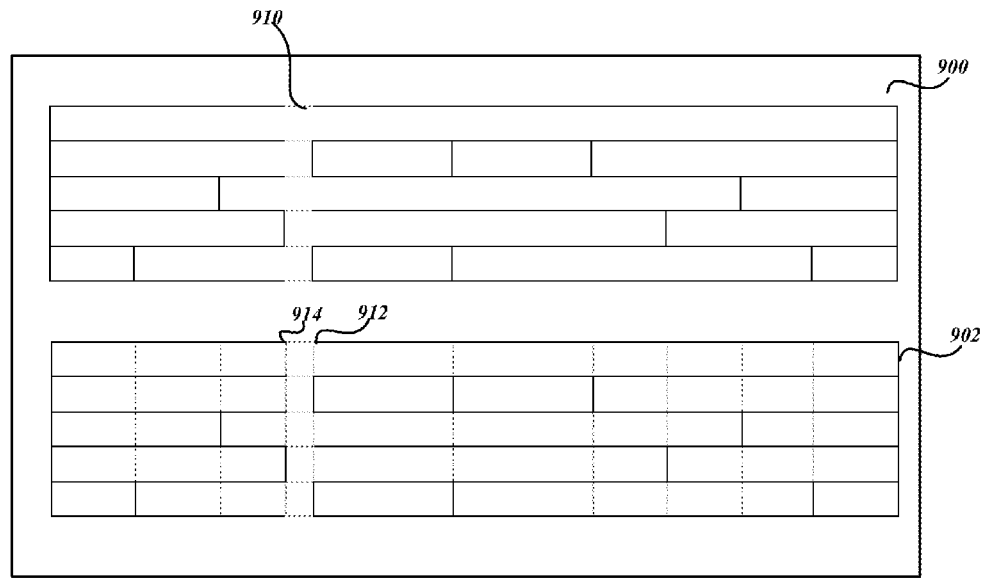
Figure 9D:
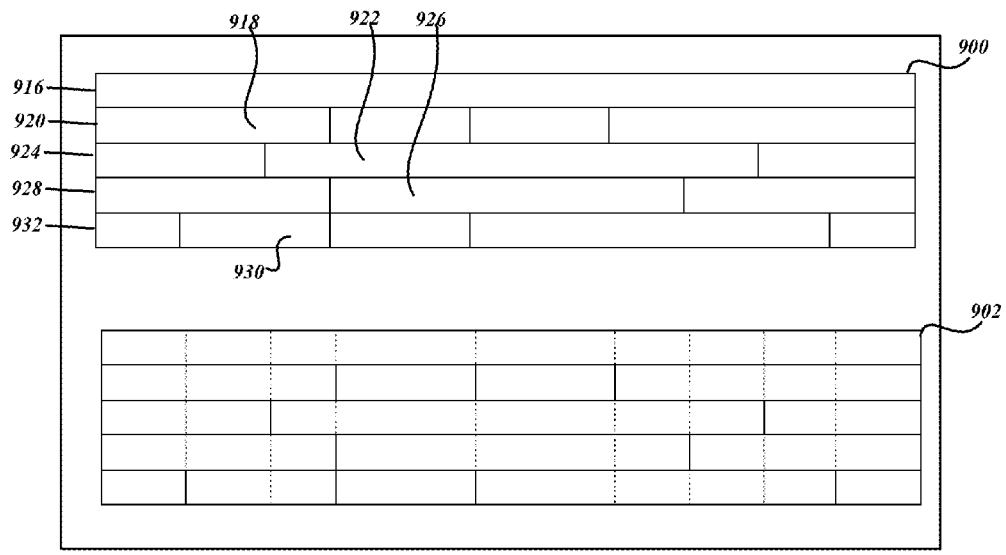

As shown in FIGS. 9B-9D, and as part of a column deletion process, a column selection is configured to smoothly fade out and a remaining chunk of the table slides over to cover the gap (e.g., on a left-justified table, the left chunk will remain stationary as the right chunk slides to the left, etc.). As shown in FIG. 9B, the column deletion action and/or animation begins with a portion 910 of the table 900 fading in contrast from other table borders based in part on parameters of the underlying grid column 908 associated with the table selection.

FIG. 9C depicts the portion 910 reduced by an amount denoted by the contraction of grid border 912 towards grid border 914. FIG. 9D depicts the table 900 after the column deletion operation and associated animation is complete. It will be appreciated that there be any number of animation transitions until the deletion operation is complete. As shown in FIG. 9D, the column deletion animation resulted in grid border 912 moving a distance to grid border 914 that is equal to the width of previously existing underlying grid column 908 which has been deleted from the underlying grid structure.

Moreover, the table 900 is now smaller in width, yet the outer table border remains structurally uniform. According to this example, no cells have been deleted due in part to a lack of table borders of individual table columns that coincide with grid borders 912 and 914, however one or more cells could be removed, for example if it's borders coincided with or internal to grid borders 912 and 914. For this example, the column deletion operation resulted in table row 916 contracting in an amount equal to the width of the underlying grid column 908 associated with the original selection. Additionally, cell 918 of table row 920, cell 922 of table row 924, cell 926 of table row 928, and cell 930 of table row 932 have each contracted in an amount equal to the width of the underlying grid column 908 associated with the original selection. In other embodiments, the width of any new column can be of different sizes dependent in part on a particular implementation of the deletion logic and parameters.

Animations of the space and/or column deletion operations are based in part on the dimensions of the underlying grid column 908 and/or any contraction algorithm that controls the visualization of the column contraction and/or deletion process. The underlying grid structure and the composite rendering 902 are not typically shown to the user. In an embodiment, a contraction animation function can be used in conjunction with aspects of the underlying grid structure to control the visualization of a deletion animation on an associated table. For example, an animation function can be used to control the column deletion visualization by, gradually, instantaneously, and/or at some accelerated or constant contraction rate, closing the area associated with the additional space and/or a removed column location for the table 900.

Other table visualizations can be configured to reflect table actions that may not affect the underlying grid structure. In an embodiment, other table visualizations include, but are not limited to: sorting a table column that includes a visualization where contents of each row fall or rise into respective cells from either the top or the bottom depending on whether the sort was an ascending sort or a descending sort; filtering a column such that affected rows slide upwards, while the rows that to be filtered out slide behind the rows that will remain (when unfaltering or filtering a large amount of data, previously hidden rows will slide out from behind the visible rows as the table grows downward); and/or summing a column or row (e.g., user adds or updates a function of a cell), wherein the new value will appear a little above the desired location and then slide vertically into place.

Table visualizations can also be associated with moving a column or row. In an embodiment, a moving operation results in a selected column/row pulling or rising out from the table (e.g., indicated by a shadow around the selection), wherein a moving column/row slides on top of the other columns/rows which will gradually shift over to fill in the gap left behind. As part of a moving operation of one embodiment, when dropped back into the table, the column/row will lose the shadow and be perceived as being flattened into the table surface. If, on the other hand, the column/row is moved out of the table, the shadow is retained until the column/row is placed (e.g., flattened) in the document, table, or other location. A column or row table move action can be described as a deletion action followed by an insertion action where the insertion comprises the deleted table content and/or structure. Thus, a move action is also guided and/or controlled by the underlying grid structure.

The table animation visualizations can provide movement to be perceived as a column on rails in that columns can be made to slide horizontally. For example, to move a column to the right, the table manager slides the column towards the destination, while sliding the other columns to the left, filling the open space. On rails operations can be described as the way a column is restricted to movement in only one direction (e.g., horizontal). In one embodiment, a move boundary can be used when a user has displaced the mouse a vertical distance greater than some threshold, where the table manager is configured to manipulate the column to pop or rise out of the table and become an independent entity.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing/communication devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 10:
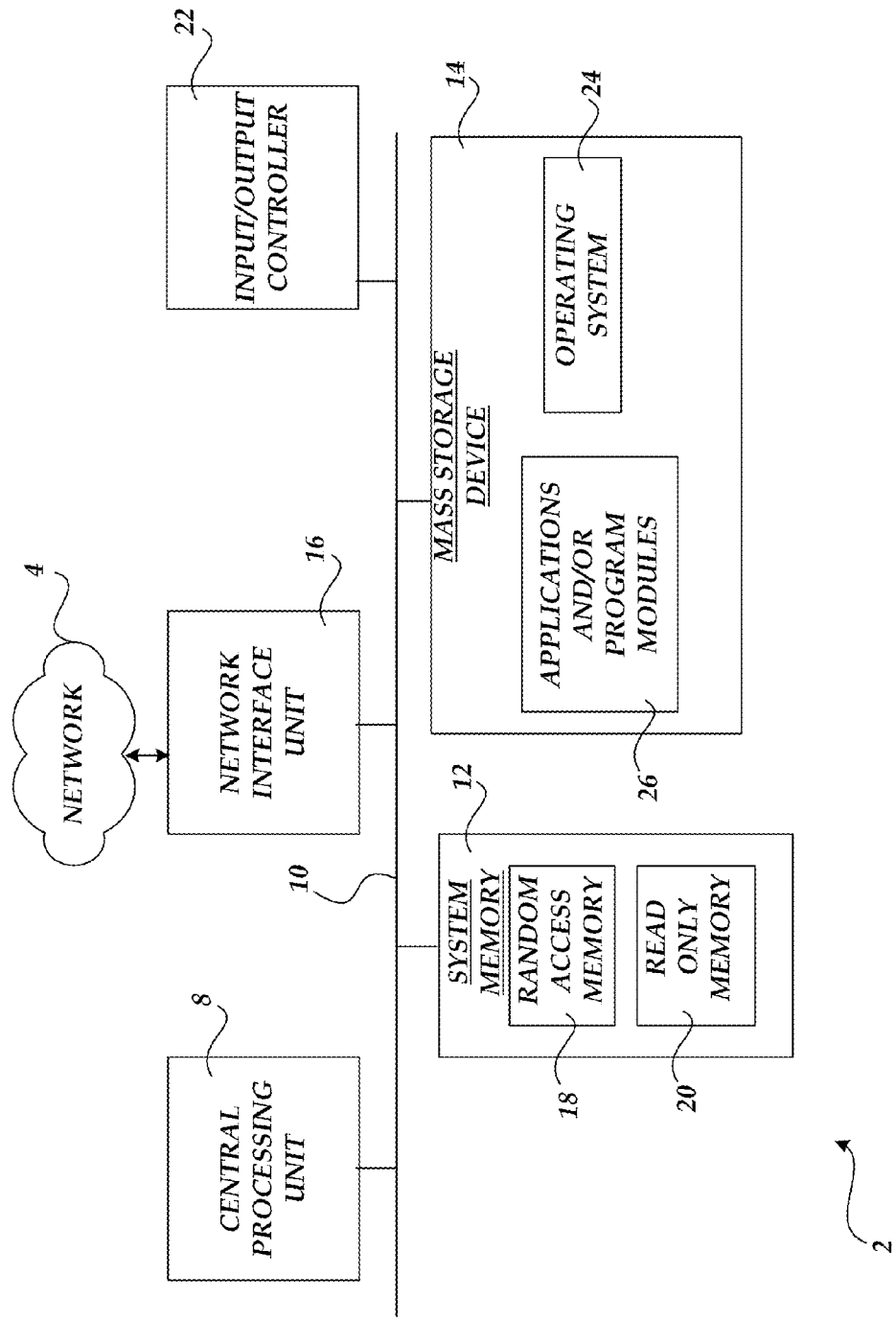
FIG. 10 is a block diagram illustrating an exemplary computing environment for implementation of various embodiments described herein.

Referring now to FIG. 10, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that embodiment of the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 10, an exemplary illustrative operating environment for embodiments of the invention will be described. As shown in FIG. 10, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow.

Accordingly, it is not intended that the scope of the invention in any way be limited by the above description, but instead be determined entirely by reference to the claims that follow.

What is claimed is:

1. A method comprising:
   receiving a selection to insert a table structure into a word processing document;
   displaying the table structure including an outer table border and a number of interior table borders including bound interior table borders and at least one of a semi-bound interior table border and an unbound interior table border, wherein the semi-bound table border includes one end coupled to the outer table border, and ends of the unbound interior table border do not extend to the outer table border;
   generating an underlying grid structure for the table structure by expanding the one or more semi-bound and unbound interior table borders to define corresponding bound underlying grid structure borders, the underlying grid structure comprising an outer grid border corresponding to the outer table border and bound interior grid borders corresponding to the bound, and the expanded one or more semi-bound and unbound interior table borders, wherein all borders of the underlying grid structure are bound; and
   displaying a table animation animating a table action using constraints dictated by the underlying grid structure, wherein the table action is one of: a column deletion action, a column insertion action, a row deletion action, and a row insertion action.

2. The method of claim 1, further comprising managing display of the table animation using grid boundaries as determined in part by an interaction point relative to the outer table border.

3. The method of claim 1, further comprising using boundaries associated with an underlying grid column or row as part of animating a column or row selection action.

4. The method of claim 3, further comprising determining the relevant borders of the underlying grid column or row based in part on an interaction location outside of the table structure and nearest interior table borders relative to a line extending horizontally or vertically from the interaction location.

5. The method of claim 1, further comprising using boundaries associated with an underlying grid column or row as part of determining the result of a column or row selection action.

6. The method of claim 1, further comprising using aspects of the underlying grid structure as part of an animation constraint to visualize selection, insertion, and deletion table actions.

7. The method of claim 1, further comprising using aspects of the underlying grid structure as part of guiding and controlling interactive table actions.

8. The method of claim 1, further comprising providing a selection indication based in part on whether the table action results from interacting inside or outside of the outer table border including using a corresponding underlying grid boundary as an animation reference.

9. The method of claim 1, further comprising controlling an animation sequence based in part on structural constraints of an underlying grid column or row associated with the table action.

10. The method of claim 1, further comprising updating aspects of the underlying grid structure based on results of a table portion insertion action, a table portion deletion action, a table portion resize action, or a table portion move action.

11. The method of claim 1, further comprising animating aspects of the table structure based on a sorting a table column action or a filtering a table column action.

12. The method of claim 1, further comprising animating aspects of the table structure based on a moving a table column or row action.

13. A system comprising:
at least one processor and memory;
a table manager to manage operations associated with a table, wherein the table includes an outer table border and a number of interior table borders including one or more bound interior table borders, semi-bound interior table borders, and unbound interior table borders, wherein a semi-bound table border includes one end coupled to the outer table border and ends of an unbound interior table border do not extend to the outer table border;
a grid manager to generate an underlying grid structure for the table by expanding the one or more semi-bound and unbound interior table borders to define corresponding bound underlying grid structure borders, wherein the underlying grid structure comprises an outer grid border and bound interior grid borders that are based in part on unbound and semi-bound interior table borders, wherein all borders of the underlying grid structure are bound borders and capable of being used in part as a table animation control reference; and
a display component to display the table including table animations, wherein the display of a table animation includes one of an animation animating a column deletion action, an animation animating a column insertion action, an animation animating a row deletion action, and an animation animating a row insertion action.

14. The system of claim 13, the table manager further configured to identify interior table borders that coincide with one or more underlying grid borders.

15. The system of claim 13, the grid manager further configured to identify an underlying grid border associated with a location of a table action.

16. Computer hardware storage including instructions that, when executed, operate to:
receive a control input as part of a table action associated with the table defined in part by table boundaries including an outer boundary and interior boundaries, wherein the interior boundaries include:
one or more of a bound horizontal boundary, a semi-bound horizontal boundary, an unbound horizontal boundary, and a bound vertical boundary; and
one or more of a semi-bound vertical boundary and an unbound vertical boundary, wherein a semi-bound vertical boundary includes one end coupled to the outer boundary and ends of an unbound vertical boundary do not extend to the outer boundary;
generate an underlying grid structure by expanding the semi-bound and unbound interior table borders to define corresponding bound underlying grid structure boundaries, the underlying grid structure including a grid boundary and bound horizontal and vertical interior grid boundaries defined in part by the table boundaries, wherein all the interior boundaries of the underlying grid structure are bound boundaries; and
control a display of an animation associated with the user interaction including using aspects of the underlying grid structure as an animation constraint when animating the table for certain table actions, wherein the table actions include a column deletion action, a column insertion action, a row deletion action, and a row insertion action.

17. The computer storage of claim 16 including instructions that, when executed, operate further to define the animation constraint based in part on an underlying grid boundary.

18. The computer storage of claim 17 including instructions that, when executed, operate further to translate the underlying grid boundary as part of a table display.

19. The computer storage of claim 16 including instructions that, when executed, operate further to update the underlying grid structure based on performance of the table action.

20. The method of claim 1, wherein displaying the table animation animating the column insertion action further comprises:
displaying a gap in the table corresponding to a table separation at a table portion coinciding with a bound grid border of an underlying grid column, wherein the bound grid border of the underlying grid border is not present in the table structure;
displaying and expansion of the gap to a width equal to a width of the underlying grid column; and
displaying the table with the inserted column, wherein the one or more unbound and semi bound borders remain respectively unbound and semi-bound.

* * * * *